United States Patent [19]
Banick

[11] Patent Number: 5,449,142
[45] Date of Patent: Sep. 12, 1995

[54] TWO-WAY CARTRIDGE VALVE FOR AGGRESIVE MEDIA

[75] Inventor: Gerard S. Banick, Springfield, N.J.

[73] Assignee: Automatic Switch Company, Florham Park, N.J.

[21] Appl. No.: 354,427

[22] Filed: Dec. 12, 1994

[51] Int. Cl.⁶ .................. H16K 31/40; H16K 31/42
[52] U.S. Cl. .................... 251/30.04; 251/45
[58] Field of Search .............. 251/30.02, 30.03, 30.04, 251/30.05, 45, 46, 61.1, 61.2, 61.4

[56] References Cited

U.S. PATENT DOCUMENTS

| | | | |
|---|---|---|---|
| 2,940,722 | 6/1960 | Vargo | 251/30.03 |
| 3,079,952 | 3/1963 | Miller | 251/30.04 |
| 3,103,338 | 9/1963 | Marmo | 251/30.03 |
| 3,155,366 | 11/1964 | Rasmussen | 251/45 |
| 3,362,679 | 1/1968 | Wan | 251/30.03 |
| 3,363,433 | 1/1968 | Barbier | 251/30.03 |
| 3,946,983 | 3/1976 | Engberg | 251/61.2 |
| 4,179,096 | 12/1979 | Fromfield | 251/30.03 |

FOREIGN PATENT DOCUMENTS

| | | | |
|---|---|---|---|
| 2914654 | 10/1980 | Germany | 251/30.03 |
| 0750201 | 7/1980 | U.S.S.R. | 251/30.03 |
| 0974007 | 11/1982 | U.S.S.R. | 251/30.03 |

Primary Examiner—George L. Walton
Attorney, Agent, or Firm—Levine & Mandelbaum

[57] ABSTRACT

A two-way cartridge valve for aggressive media has a replaceable module including a main valve seat, a diaphragm sealing member for the valve seat, and a pilot seat. In one embodiment, a leaf spring is employed to bias the diaphragm toward the open position for actuation under conditions of minimal pressure differential. In another embodiment a resilient support is provided for the diaphragm behind the region of engagement with the main seat.

21 Claims, 5 Drawing Sheets

TWO-WAY CARTRIDGE VALVE FOR AGGRESIVE MEDIA

BACKGROUND OF THE INVENTION

This invention relates to diaphragm valves for use in controlling the flow of fluids consisting of or containing aggressive media, and which are particularly useful in steam environments, e.g., dishwashers, laundries, and sterilizers. More specifically, the invention is directed to a modular valve diaphragm and valve seat cartridge which resists wear in a steam environment, and which can be readily and inexpensively replaced.

It is know in the art to employ a diaphragm valve wherein a diaphragm is moved by the armature of a solenoid for opening and sealing an orifice in the main seat of the valve. In order to maintain light weight and flexibility, it is desirable to have valve diaphragms that are relatively thin. However, the life of a diaphragm decreases as it is made thinner due to increased fragility and a tendency to extrude when placed under pressure, as when the diaphragm is urged against the valve seat. Moreover, due to the aggressiveness of the fluid, the flow of which is being controlled by the valve, the pilot seat and main valve seat are subject to accelerated wear and corrosion which can require the time consuming and expensive remedy of replacing the entire valve assembly.

SUMMARY OF THE INVENTION

The aforementioned problems of the prior art are overcome by the instant invention which provides for a two-way cartridge valve for aggressive media that can be easily and inexpensively replaced. More specifically, the present invention provides a two-way cartridge valve for aggressive media having a housing with an inlet port and an outlet port, a solenoid mounted on the housing, the solenoid comprising a pilot valve member and means for moving the pilot valve member between an open position and a closed position, main seat means removably mounted on the housing and having a main seat opening in communication with the inlet port and the outlet port, guide means fixedly mounted on the main seat means, main valve closure means movably mounted in the guide means and having a pilot opening, the pilot valve member engaging the main valve closure means in the closed position for sealing the pilot opening and disengaging the main valve closure means in the open position for exposing the pilot opening, the main valve closure means including diaphragm means and being movable between a first position at which the diaphragm means is in sealing engagement with the main seat means for sealing the main seat opening and preventing fluid flow between the inlet port and the outlet port when the pilot valve member is moved to the closed position, and a second position in which the diaphragm means is in disengagement with the main seat means for exposing the main seat opening and permitting fluid flow between the inlet port and the outlet port when the pilot valve member is in the open position. In one embodiment the pilot seat means and has a backup support means with a surface in engagement with the diaphragm means and retainer means for fixing the diaphragm means and the backup support means on the pilot seat means. In a second embodiment, the pilot seat is on a main valve closure means which includes rigid support means, resilient cushioning means mounted on the rigid support means, and diaphragm means mounted on the support means and covering the resilient cushioning means.

It is therefore an object of the invention to provide a valve which is suitable for use in corrosive environments.

Another object of the invention is to provide a valve which can be opened or closed with minimal pressure differential between the valve inlet and outlet ports.

Still another object of the invention is to provide a valve with a pilot seat, diaphragm sealing member, and main seat contained in a easily replaceable module.

A further object of the invention is to provide a valve with a pilot seat, diaphragm sealing member, and main seat contained in a easily replaceable module that filters the controlled fluids to prevent passage of contaminants.

Still a further object of the invention is to provide a valve with a diaphragm that can withstand high pressure environments.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
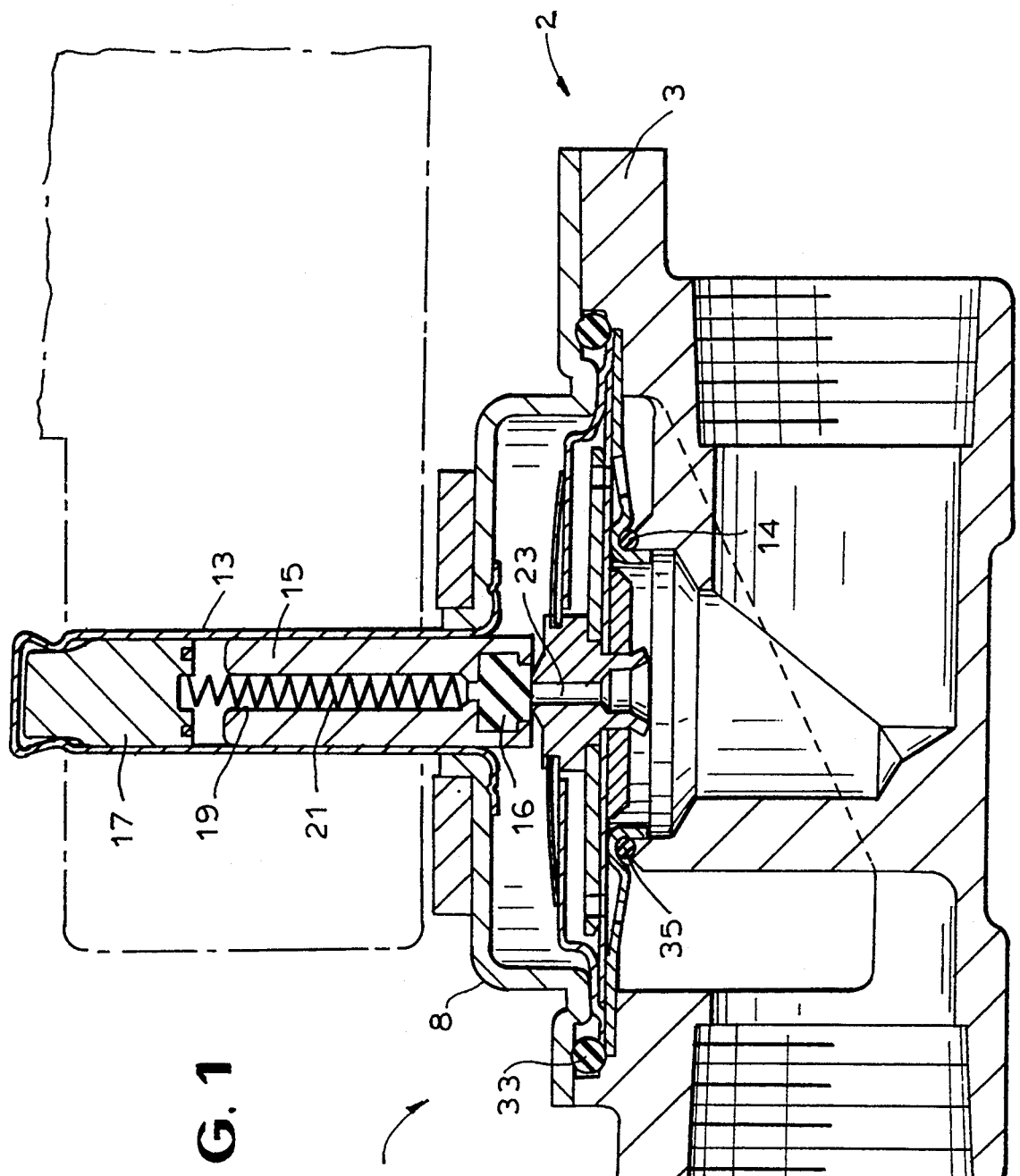
FIG. 1 is a sectional elevation view of a two-way cartridge valve for aggressive media in accordance with a first embodiment of the invention in a first disposition.
Figure 2:
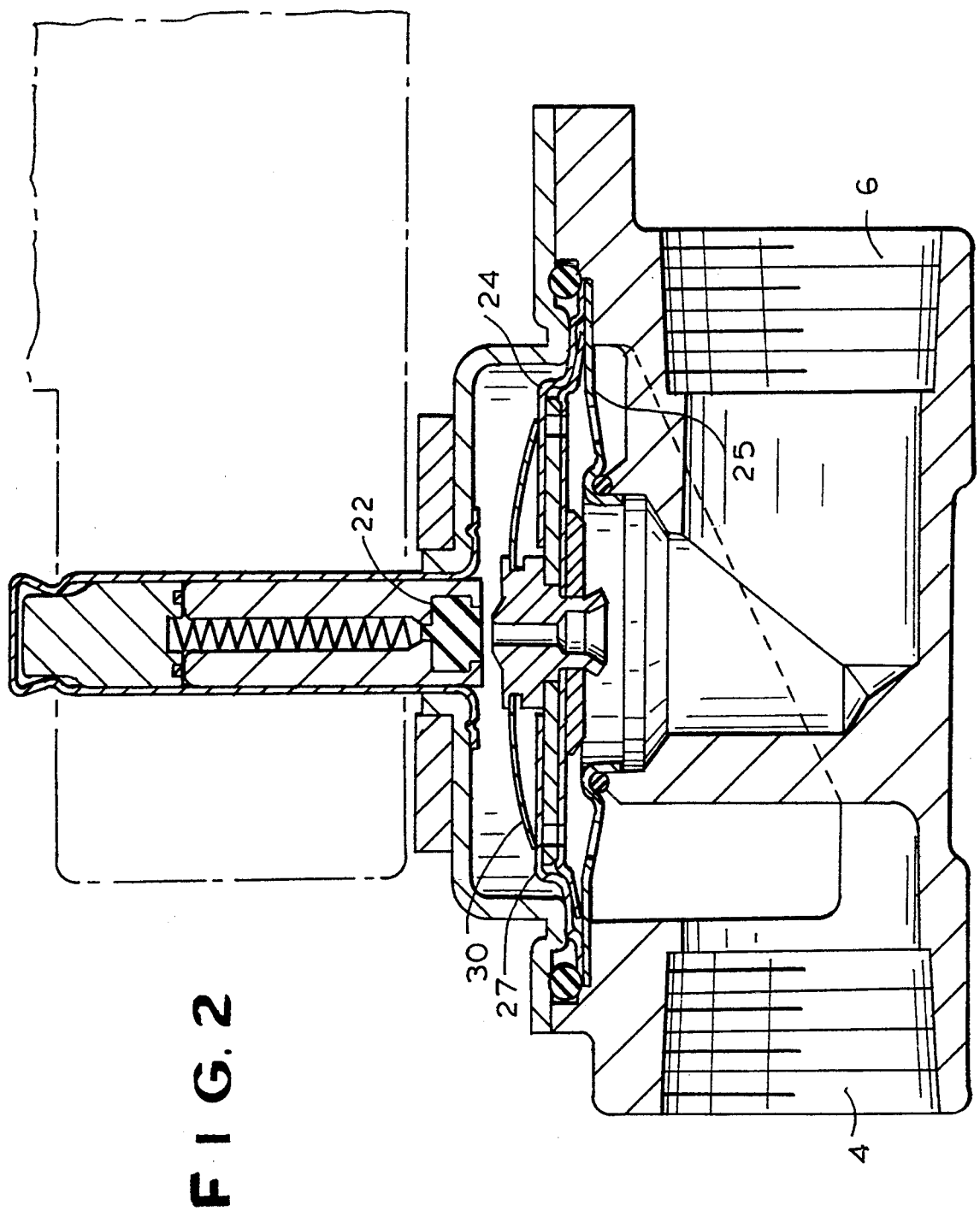
FIG. 2 is a sectional elevation view of a two-way cartridge valve for aggressive media in accordance with the first embodiment of the invention in a second disposition.
Figure 3:
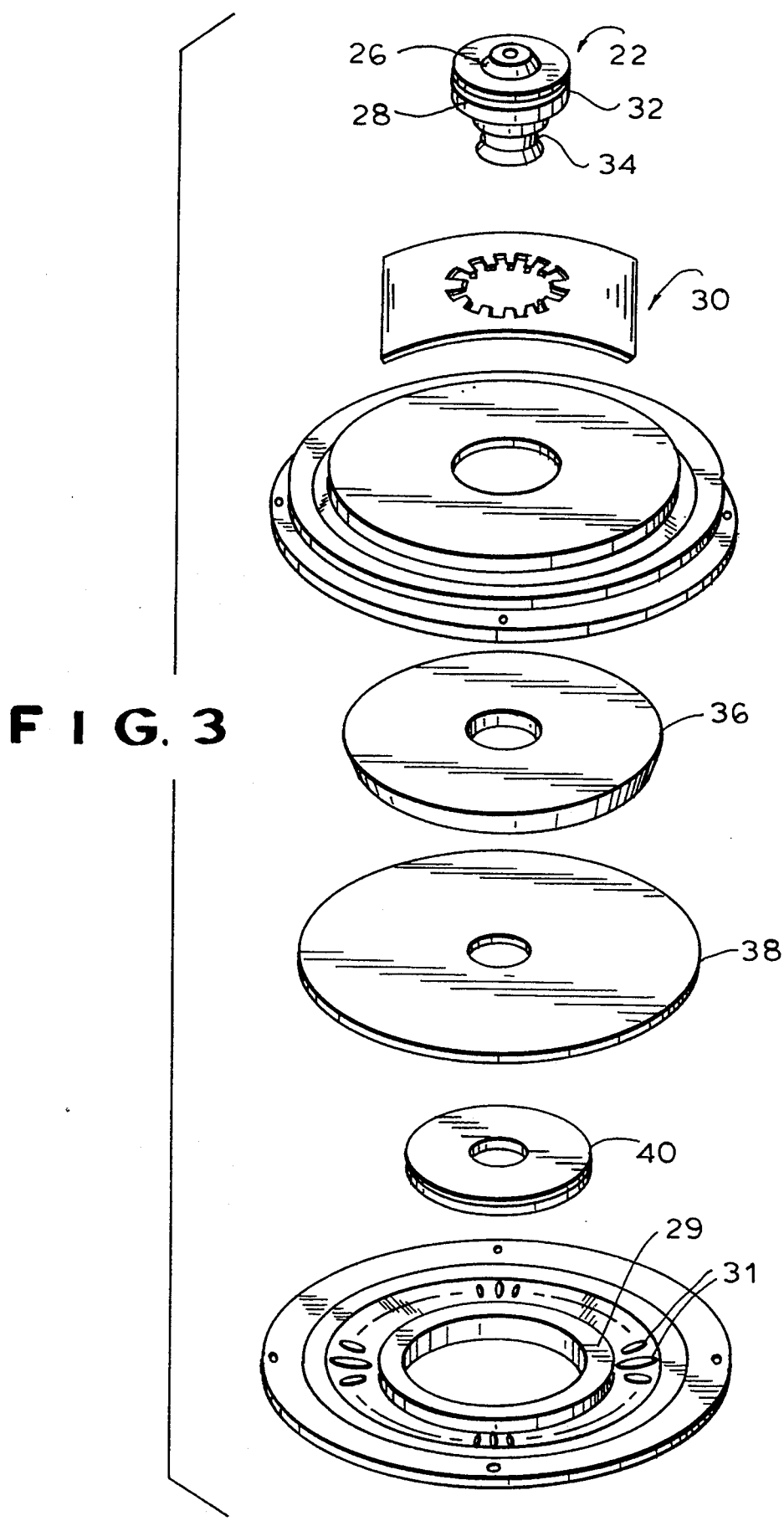
FIG. 3 is an exploded perspective view of a two-way cartridge valve for aggressive media in accordance with the first preferred embodiment of the invention.

Referring now to FIGS. 1, 2, and 3 of the drawings, there is shown a normally closed two-way solenoid valve 1 which is closed in FIG. 1 and open in FIG. 2. The valve 1 has a main housing with a body 3 in which there is an inlet port 4 and an outlet port 6, and a cover 8. The inlet port 4 and outlet port 6 are formed in the body 3 of the main housing 2.

The solenoid valve 1 has an actuator which includes a yoke of magnetic material, and an electrical coil (both not shown) surrounding a core tube 13 which serves as an armature guide. The core tube 13 of the solenoid is mounted in a central opening in the main housing cover 8. Within the core tube 13 is an axially reciprocable armature 15. Mounted on the lower end of the armature 15 is a resilient pilot valve member 16.

A pole piece in the form of a plug nut 17 of magnetic material is fixedly mounted in the upper region of the. The armature 15 has a blind cylindrical bore 19 in which there is disposed a coil spring 21 having a free end in engagement with plug nut 17. The spring 21 normally urges armature 15 toward a pilot bleed member 22, that is, to the normally closed position of the valve 1, whereat the valve member 16 seals an opening in the pilot member 22 as can be seen in FIG. 1.

The pilot bleed member 22 is movably mounted in a diaphragm top cover 24 which is mounted on a bottom cover 25. The top cover 24 is permanently affixed to the bottom cover 25 by crimping or welding at the peripheries of the top cover 24 and bottom cover 25. A central aperture in the top cover 24 acts as a guide of the pilot member 22. The pilot member 22 has a major cylindrical portion 32 with an outer circumference substantially equal to the diameter of the central aperture in the top cover 24 with just enough clearance between the pilot bleed member 22 and top cover 24 to permit axial movement of the pilot bleed member 22 relative to the top cover 24, while preventing relative radial movement.

A truncated frustoconical pilot seat 26 is coaxially integral with, and extends upwardly from, the pilot bleed member 22. A cylindrical bore through the central axis of the pilot bleed member 22 communicates with a central pilot opening in the pilot seat 26.

Disposed in the outer cylindrical wall of the pilot bleed member 22 is a groove 28 for receiving a leaf spring 30 which is downwardly bowed and has its ends in engagement with the top surface of the top cover 24 to urge the pilot bleed member 22 upwardly in the views of FIGS. 1-3. The upward force exerted by the leaf spring 30 is less than the force exerted by the coil spring 21.

Extending downwardly from the major cylindrical portion 32 of the pilot bleed member 22 is a minor cylindrical portion 34 with an outer diameter less than the outer diameter of the major cylindrical portion 32 and an interior cylindrical bore having a diameter greater than the diameter of a bore in the major cylindrical portion 32 of the pilot bleed member 22.

Mounted on the minor cylindrical portion 34 of the pilot member 22 is a diaphragm 38 sandwiched between a backup washer 36 and a retaining washer 40. The backup washer 36, diaphragm 38, and retaining washer 40 each have a central aperture substantially equal in diameter to the outer diameter of the minor cylindrical portion 34 of the pilot bleed member 22. After the backup washer 36, diaphragm 38, and retaining washer 40 are fixedly mounted on the minor cylindrical portion 34 of the pilot bleed member 22, the end of the minor cylindrical portion 34 is flared, as will be known to those skilled in the art, to prevent detachment of the backup washer 36, diaphragm 38, and retaining washer 40 from the pilot bleed member 22.

The bottom cover 25 provides the main seat for the valve 1 and has a central main seat aperture larger in diameter than the outer diameter of the retaining washer 40 but smaller in diameter than the diaphragm 38. The top cover 24 is generally concave downwardly and the bottom cover 25 is generally concave upwardly in the views of the drawings to form the housing of a cartridge 27 in which the pilot bleed member 22, and diaphragm 38 are captured but permitted limited axial reciprocation.

Surrounding the central opening in the bottom cover 25 is a circular ridge 29 that rises from the upper surface of the bottom cover 25 and acts as the main seat for the valve 1. Spaced radial slots 31 are provided about the entire circumference of the main seat to remove sediment and other impurities from the fluid transmitted between the inlet port 4 and outlet port 6 when the valve 1 is open. Hence the bottom cover 25 serves as both a main seat and a filter for the valve 1. A circular cylindrical wall 23 surrounding the opening in the bottom cover 25 extends downwardly from the lower surface of the bottom cover 25.

The radius of the diaphragm 38 is greater than the radii of the backup washer 36 and retaining washer 40 so that the outer circumference of the diaphragm 38 can be received and held in a narrow opening between the top cover 24 and bottom cover 25 adjacent the outermost peripheries of the top cover 24 and bottom cover 25 which are fastened together.

The cartridge 27 containing the pilot bleed member 22, leaf spring 30, top cover 24, backup washer 36, diaphragm 38, retaining washer 40, and bottom cover 25, is seated atop the body 3 of the housing of the valve 1, over the outlet port 6 with the bottom cover circular wall 23 entering the outlet port opening. The outer diameter of the bottom cover circular wall 23 and the inner diameter of the mouth leading to the outlet port 6 are substantially equal to prevent radial movement of the cartridge 27 relative to the main housing body 3.

A compressible resilient O-ring 35 is mounted between the underside of the bottom cover 25 and the main housing body 3 about the outlet port 6 for forming a fluid-tight seal between the cartridge 27 and the body 3 of the main housing. Another compressible resilient O-ring 33 is mounted between the main housing cover 8 and the outer periphery of the top cover 24 for forming a fluid-tight seal between the body 3 and main housing cover 8, O-ring also retains cartridge 27 in body 3.

The cartridge 2 can be removed from the valve i and replaced merely by removing the valve main housing cover 8 from the main housing body 3, removing the outer O-ring 33, and lifting the cartridge 27 off of the outlet port 6. A replacement cartridge can then be placed atop the outlet port 6, with a new outer O-ring 33 placed over the edge of the top cover 24 of the cartridge, and the main housing cover 8 can then be refastened to the main housing body 3.

In use, the valve 1 of FIGS. 1-3 operates as follows. As shown in FIG. 1, a normally closed valve 1 is in its closed position with the coil (not shown) deenergized and the armature 15 urged downwardly by the coil spring 21 so that the valve member 16 is in sealing engagement with the pilot bleed member 22 of the cartridge 27. The force of the coil spring 21 is greater than the opposing force of the leaf spring 30 so that the pilot bleed member 22 is urged to its lowermost position with the diaphragm 38 in sealing engagement with the main seat, i.e., circular ridge 29, in the bottom cover 25 of the cartridge 27, and the retainer washer 40 received within the main valve seat opening.

When the valve 1 is to be opened, the magnetic force imparted to the plug nut 17 upon energization of the coil overcomes the force of the coil spring 21 and raises the armature 15 to the position shown in FIG. 2 thereby lifting the valve member 16 away from the pilot bleed member 22 and exposing the opening in the pilot seat 26. With the pilot seat 26 opening exposed, there is an equalization in pressure between the region about the diaphragm 38 and the outlet port 6.

Where the pressure in the inlet port 4 exceeds that in the outlet port 6, the net upward force on the diaphragm 38 lifts the diaphragm 38, and the pilot bleed member 22 with it, thereby exposing the opening in the main seat to the inlet port 4 and permitting fluid in the inlet port 4 to flow to the outlet port 6. Even where the pressure drop across the valve 1 is very low, the diaphragm 38 is still urged upwardly by the leaf spring 30 to open the valve 1.

When fluid flow through the valve 1 is to be stopped, the coil is deenergized and the coil spring 21 urges the armature 15 and valve member 16 into engagement with the pilot bleed member 22 thereby first sealing the opening in the pilot seat 26 and, thereafter, urging the diaphragm 38 to engage the main seat at circular ridge 29.

Figure 4:
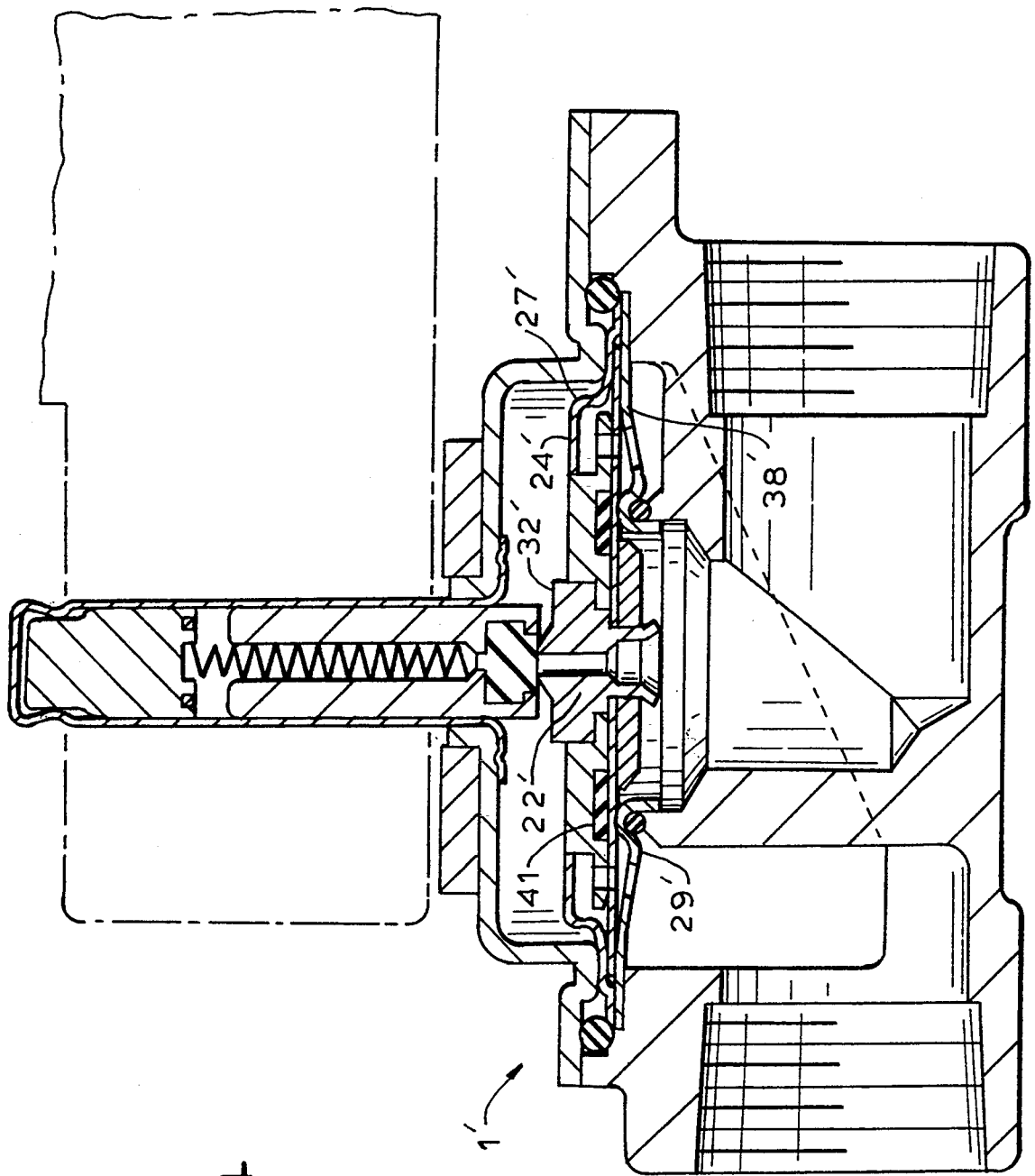
FIG. 4 is a sectional elevation view of a two-way cartridge valve for aggressive media in accordance with a second embodiment of the invention in a first disposition.
Figure 5:
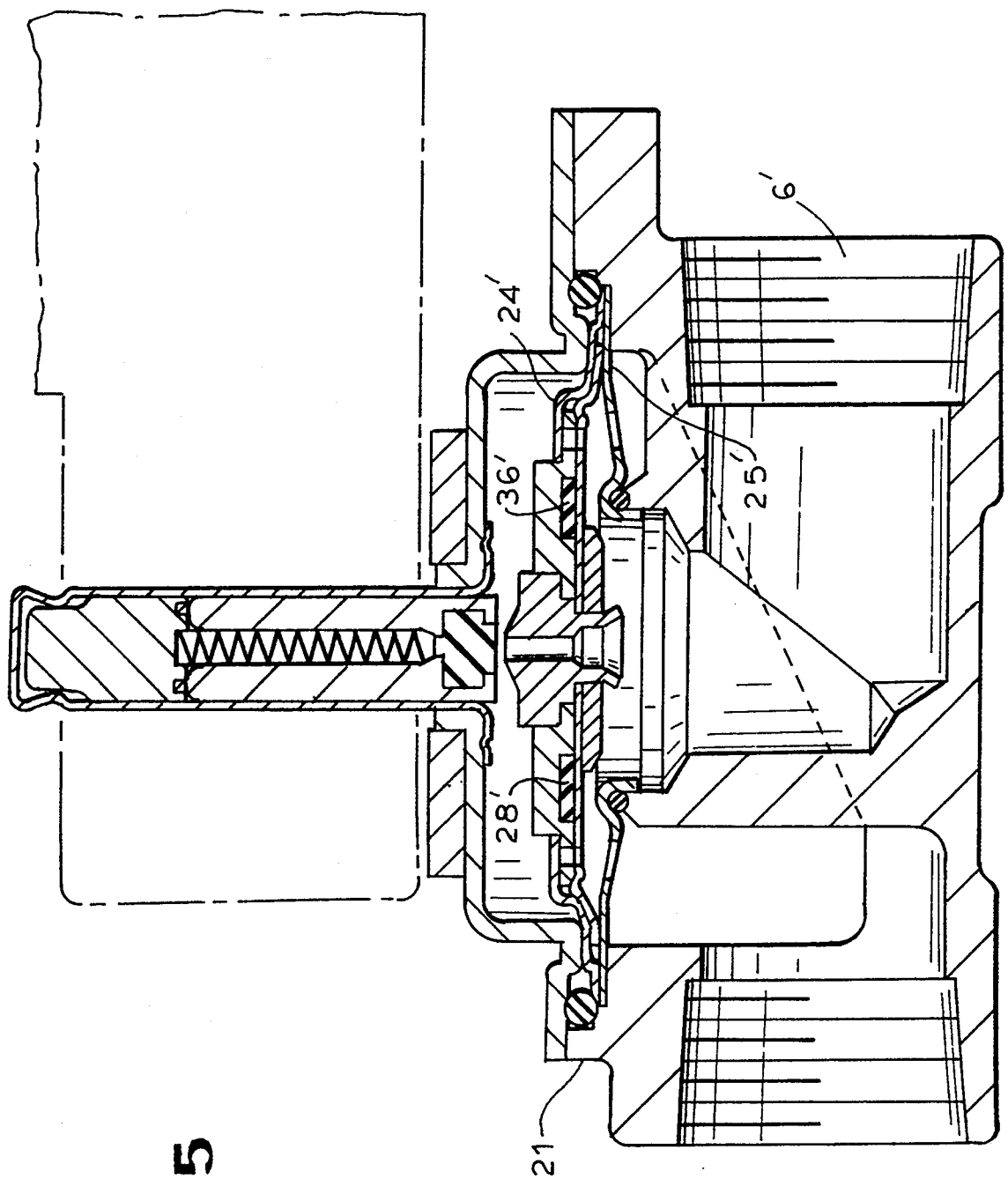
FIG. 5 is a sectional elevation view of a two-way cartridge valve for aggressive media in accordance with the second embodiment of the invention in a second disposition.

Referring now to FIGS. 4 and 5 of the drawings there is shown a second embodiment of the invention particularly suitable for high temperature environments, e.g., where the flow of steam is to be controlled.

The valve 1' of FIGS. 4 and 5 is identical to the valve 1 of FIGS. 1-3 except for the following differences in the cartridge 27'. The cartridge 27' has a top cover 24' and a bottom cover 25'. The bottom cover 25' is essentially identical to the bottom cover 25 of the embodiment of FIGS. 1-3. A main disc 36' has a stepped diameter with a raised circular track on its upper surface and a circular groove 28 with a rectangular cross section on its lower surface. Disposed in the groove 28' is a ring 41 of Teflon or other resilient material similar in physical properties to the diaphragm 38'. The lower surface of the ring 41 is coplanar with the radially adjacent regions of the main disc 36' to provide a flat supporting surface for the diaphragm 38'.

The inner radius of the ring 41 is less than the radius of the main seat 29' and the outer radius of the ring 41 is less than the radius of the main seat 29' so that when the cartridge 27' is in place over the outlet port 6' of the main housing 2', and the valve 1' is closed, the diaphragm 38' is compressed between the main seat 29' and the ring 41. The ring 41 cushions, and absorbs the impact of, the diaphragm 38' on the main seat 29' thereby preventing extrusion of the diaphragm 38', especially at high pressures, and enhancing its life.

A pilot bleed member 22' has a major cylindrical portion 32' with an outer circumference substantially equal to the uppermost diameter of a stepped central cylindrical bore in the main disc 36'. The lower end of the pilot bleed member 22' is flared to axially fix the pilot bleed member 22' to the main disc 36'.

The top cover 24' has a central aperture with a diameter substantially equal to the outer diameter of the raised track on the main disc 36' which acts as a guide for permitting reciprocation of the main disc 36' within the top cover 24' for enabling the diaphragm 38' to engage and disengage the main seat 29' while preventing radial movement of the main disc 36' and diaphragm 38' with respect to the top cover 24' and the bottom cover 25' to which the top cover 24' is fastened.

The function of the embodiment of FIGS. 4 and 5 is similar to that of FIGS. 1-3 except for the differences described above and will be understood by those skilled in the art.

It is to be appreciated that the foregoing is a description of two preferred embodiments of the invention to which variations and modifications may be made without departing from the spirit and scope of the invention. For example, although disclosed in the environment of a normally closed valve, the invention can be adapted for use in a normally open valve.

What is claimed is:

1. A two-way cartridge valve for aggressive media comprising a housing having an inlet port and an outlet port, a solenoid mounted on said housing, said solenoid comprising a pilot valve member and means for moving said pilot valve member between an open position and a closed position, main seat means removably mounted on said housing and having a main seat opening in communication with said inlet port and said outlet port, guide means, having an opening disposed therein, fixedly mounted on said main seat means at a location distal from said guide means opening, main valve closure means having a first portion thereof movably mounted in said opening of said guide means and having a pilot opening and pilot seat means circumscribing said pilot opening, said pilot valve member engaging said pilot seat means in said closed position for sealing said pilot opening and disengaging said pilot seat means in said open position for exposing said pilot opening, a second portion of said main valve closure means disposed between said main seat means and said guide means and being freely movable therebetween as said first portion of said main valve closure means freely moves within said guide means opening, said second portion comprising diaphragm means and being movable between a first position at which said diaphragm means is in sealing engagement with said main seat means for sealing said main seat opening and preventing fluid flow between said inlet port and said outlet port when said pilot valve member is moved to said closed position and a second position in which said diaphragm means is in disengagement with said main seat means for exposing said main seat opening and permitting fluid flow between said inlet port and said outlet port when said pilot valve member is in said open position, therein disengaged from said pilot seat means.

2. A two-way cartridge valve for aggressive media according to claim 1 wherein said guide means is fastened to said main seat means and said main valve closure means is captured therebetween.

3. A two-way cart,ridge valve for aggressive media according to claim 1 wherein said first portion of said main valve closure means comprises a pilot bleed member, and backup support means mounted on said pilot bleed member and having a planar surface in engagement with said diaphragm means for supporting said diaphragm means when it engages said main seat means.

4. A two-way cartridge valve for aggressive media according to claim 3 further comprising retainer means mounted on said pilot bleed member and having a surface in engagement with said diaphragm means for fixing said diaphragm means and said backup support means on said pilot bleed member.

5. A two-way cartridge valve for aggressive media according to claim 4 wherein said main seat means has an opening in communication with said inlet port and said outlet port, and a diameter smaller than a corresponding diameter of said backup support means and larger than the diameter of said retainer means, said backup support means, diaphragm means retainer means and main seat means opening being coaxial, said retainer means being received within said main seat means opening and said backup support means urging said diaphragm means against said main seat means for sealing said main seat means opening when said pilot seat means is in said closed position.

6. A two-way cartridge valve for aggressive media according to claim 1 further comprising biasing means mounted between said main valve closure means and said guide means for urging said main valve closure means toward said first position.

7. A two-way cartridge valve for aggressive media according to claim 6 wherein said solenoid further comprises armature spring means urging said valve member toward said pilot seat means with a force greater than the opposing force of said bias means.

8. A two-way cartridge valve for aggressive media according to claim 1 wherein said main seat means has radial apertures surrounding said main seat opening for filtering said media during flow from said inlet port to said outlet port.

9. A two-way cartridge valve for aggressive media according to claim 8 wherein said apertures are radially disposed about said main seat opening.

10. A two-way cartridge valve for aggressive media according to claim 9 wherein said apertures are in the shape of slots with radially oriented major dimensions.

11. A two-way cartridge valve for aggressive media in accordance with claim 1 wherein said main valve closure means comprises rigid support means, resilient cushioning means mounted on said rigid support means, and diaphragm means mounted on said rigid support means and covering said ring means.

12. A two-way cartridge valve for aggressive media in accordance with claim 11 wherein said cushioning means has an outer diameter greater than the diameter of said main seat opening and an inner diameter less than the diameter of said main seat opening, said cushioning means and main seat opening being coaxial whereby said cushioning means urges said diaphragm into engagement with said main seat means.

13. In a valve having a housing with an inlet port, an outlet port, and a main valve opening in communication with said inlet port and outlet port, a solenoid mounted on said housing, said solenoid comprising a pilot valve member and means for moving said pilot valve member between an open position and a closed position, the improvement which comprises a replaceable valve sealing cartridge including main valve closure means having a pilot opening and pilot seat means circumscribing said pilot opening, said pilot opening being sealed by said pilot valve member engaging said pilot seat means when in said closed position for causing said main valve closure means to seal said main valve opening, and exposed when said pilot valve member is disengaged from said pilot set member in said open position for causing said main valve closure means to disengage said main valve closure for exposing said pilot opening, main seat means having a main seat opening, and guide means, having an opening disposed therein, fixedly mounted on said main seat means at a location distal from said opening said main valve closure means having a first portion thereof movably mounted in said opening of said guide means and a second portion of thereof being captured between said guide means and main seat means and being freely movable therebetween as said valve closure means portion freely moves within said opening, said guide means permitting axial movement but impeding radial movement of said main valve closure means relative thereto, said main valve closure means comprising diaphragm means for engaging said main seat means to seal said main seat opening when said pilot opening is sealed.

14. A replaceable valve sealing cartridge according to claim 13 wherein said main valve closure means further comprises backup support means mounted on said pilot seat means and having a planar surface in engagement with said diaphragm means for supporting said diaphragm means when it engages said main seat means.

15. A replaceable valve sealing cartridge according to claim 14 further comprising retainer means mounted on said pilot seat means and having a surface in engagement with said diaphragm means for retaining said diaphragm means and said backup support means on said pilot seat means.

16. A replaceable valve sealing cartridge according to claim 13 further comprising biasing means mounted between said main valve closure means and said guide means for urging said main valve closure means away from said main seat opening.

17. A replaceable valve sealing cartridge according to claim 13 wherein said main seat means has radial apertures surrounding said main seat opening for filtering said media during flow from said inlet port to said outlet port.

18. A replaceable valve sealing cartridge according to claim 17 wherein said apertures are radially disposed about said main seat opening.

19. A replaceable valve sealing cartridge according to claim 18 wherein said apertures are in the shape of slots with their major dimension radially oriented.

20. A replaceable valve sealing cartridge in accordance with claim 13 wherein said main valve closure means comprises rigid support means, resilient cushioning means mounted on said rigid support means, and diaphragm means mounted on said support means and covering said resilient cushioning means.

21. A replaceable valve sealing cartridge in accordance with claim 20 wherein said cushioning means has an outer diameter greater than the diameter of said main seat opening and an inner diameter less than the diameter of said main seat opening, said cushioning means and main seat opening being coaxial whereby said cushioning means urges said diaphragm into engagement with said main seat means.

* * * * *